Patented Feb. 4, 1947

2,415,234

UNITED STATES PATENT OFFICE 2,415,234

ANTIGENS OF THE LYMPHOGRANULOMA-VENEREUM - PSITTACOSIS GROUP OF AGENTS AND METHOD OF PREPARING THEM

William Edward Bunney, Millstone, and Clara Nigg, Princeton, N. J., assignors to E. R. Squibb & Sons, New York, N. Y., a corporation of New York No Drawing. Application January 13, 1945, Serial No. 572,740

16 Claims. (Cl. 167—78)

This invention relates to antigens of the lymphogranuloma-venereum-psittacosis group of agents, especially to antigens of lymphogranuloma venereum.

Antigens for the diagnosis of lymphogranuloma venereum were formerly obtained (1) from human pus produced in those cases of suppurating bubo due to lymphogranuloma venereum in which no other venereal disease had coexisted and no secondary infection had supervened, or (2) by propagation of the agent of lymphogranuloma venereum in mouse brain and preparation therefrom of a saline suspension of the killed agent.

More recently, highly-active antigens suitable for use in the diagnosis (by both cutaneous and complement-fixation tests), prophylaxis, and therapy of lymphogranuloma venereum have been obtained by propagating the agent of lymphogranuloma venereum in the yolk sacs of developing fowl-embryos, and preparing a non-infectious suspension of the agent-containing embryo material (i. e., the yolk and/or the yolk sac) in a suitable aqueous medium; and improved antigens have also been obtained by inoculating mammal lung with a high-titer lymphogranuloma-venereum agent, propagating the agent therein, preparing a suspension of the lung material in a suitable aqueous medium, removing inactive material therefrom by differential centrifugation, and rendering the suspension non-infectious. These improved antigens are described and claimed in the following patents: No. 2,324,646, dated July 20, 1943; and No. 2,355,676, dated August 15, 1944.

It is the object of this invention to provide improved non-infectious antigens of the lymphogranuloma-venereum-psittacosis group of agents, especially improved non-infectious antigens of lymphogranuloma venereum, and a method of preparing such antigens.

Infectious antigens of the lymphogranuloma-venereum-psittacosis group of agents have heretofore been inactivated by conventional treatments such as heat sterilization or formalinization. In the method of this invention, the infectious antigen is rendered non-infectious by treatment with a protein-denaturing substance of the aliphatic carbamyl-compound type, especially urea. Preferably, the inactivation is effected by treatment with such substance in dilute aqueous solution (e. g., the concentration of urea after addition being less than about 20%, desirably of the order of 1 to 5%); preferably also, the inactivation is effected at a low temperature.

In accordance with this invention, a non-infectious antigen of lymphogranuloma venereum may be obtained by propagating the agent of lymphogranuloma venereum in the yolk sacs of developing fowl-embryos, preparing an aqueous suspension of the agent-containing embryo material, and treating the suspension with urea in dilute aqueous solution.

Although the treatment of infectious antigens of certain viruses with urea has resulted in complete loss of antigenicity, the use of urea as an inactivating substance in the preparation of a non-infectious antigen in accordance with this invention results in substantially no loss of antigenicity; and the resulting antigen of lymphogranuloma venereum, for example, is superior to the corresponding formalin-inactivated antigen heretofore employed, in that the former gives fewer nonspecific reactions.

The following examples are illustrative of this invention:

Example 1

Six-day chicken eggs—i. e., chicken eggs in the sixth day of embryonic development—are each inoculated in the yolk sac (in the known manner) with 1 cc. of a 1:100 to 1:100,000 dilution of bacteriologically-sterile yolk-sac harvested from eggs infected by this route with the agent of lymphogranuloma venereum.

After 5 to 6 days (i. e., as soon as the embryos are moribund or dead), the eggs are opened and the yolk sacs removed, weighed, and made up to a 10% suspension with physiological saline solution, and the suspension is mechanically shaken for about a half hour. The fluid portion of the suspension is then separated from the tissue residue and measured, and sufficient sterile 20% aqueous urea solution added to give a final concentration of 1 to 2% urea; and the urea-treated suspension is kept at icebox temperature for one or two weeks, and then tested for viable agent therein (e. g., by inoculation of chick embryos). When the agent has been completely inactivated, the antigen is ready for use, after appropriate dilution (depending on the potency of the antigen). Thus, the antigen may be diluted 1:100 and then used in the conventional complement-fixation test for the detection of lymphogranuloma-venereum infection. The results obtainable with this antigen in the complement-fixation test are even superior to those obtained with the formalinized antigen heretofore employed in that test.

The antigen may also be used for diagnosis by cutaneous test.

Example 2

Mice are inoculated intranasally, under light ether-anesthesia, with 0.03 to 0.05 cc. of a 1:10 dilution (in broth) of lungs harvested from mice infected by this route with the agent of lymphogranuloma venereum.

After 2 to 3 days (or as soon as they are sick, moribund, or dead), the mice are opened, and the lungs removed, pooled, ground with abrasive, and made up to a 10% suspension with physiological saline solution. The suspension is frozen at −32° F., thawed, and centrifuged 10–60 minutes at 2,000–3,000 R. P. M. in the cold (the sediment being discarded). The supernatant is measured, and sufficient sterile 20% aqueous urea solution is added thereto to inactivate the agent; and the urea-treated preparation is kept at icebox temperature until inactivation is complete, and then tested for bacterial sterility (in the usual manner), and for absence of active agent by inoculation into mice or the yolk sac of developing chick-embryos. The resulting product is a highly-active lymphogranuloma-venereum antigen suitable, after appropriate dilution, for use in diagnosis (by both cutaneous and complement-fixation tests). Preferably, a preservative is added to the diluted antigen if it is to be used for diagnosis by cutaneous test.

Example 3

Six-day chicken eggs are each inoculated in the yolk sac (in the known manner) with 0.5–1 cc. of 1:100 to 1:100,000 dilution of bacteriologically-sterile yolk-sac harvested from eggs infected by this route with the agent of lymphogranuloma venereum.

After 5 to 8 days (i. e., as soon as the embryos are moribund or dead), the eggs are opened and the yolk sacs removed, weighed, and made up to a 10% suspension with physiological saline solution, and the suspension is homogenized in a mechanical blender for 3 to 4 minutes. To the suspension is then added sufficient sterile 20% aqueous urea solution to give a final concentration of 1 to 2% urea; and the urea-treated suspension is kept at icebox temperature for one or two weeks, and then tested for viable agent therein (e. g., by inoculation of chick embryos). When the agent has been completely inactivated, the suspension is centrifuged at low speed; and the supernatant, after appropriate dilution (depending on the potency of the antigen) and addition of a preservative, is ready for use as an antigen in the conventional cutaneous test for the detection of lymphogranuloma-venereum infection.

Usually, the supernatant is diluted 1:100; and preferably the preservative is (a mixture of) Merthiolate and phenol, added to give a final concentration of 1:20,000 and 0.25% respectively. If the antigen is to be used for diagnosis by complement-fixation test, the preservative is omitted.

The invention is applicable to the provision of non-infectious antigens of the lymphogranuloma-venereum-psittacosis group of agents generally; i. e., the group consisting of the agents of lymphogranuloma venereum, feline pneumonitis (Baker), mouse pneumonitis (Nigg), meningopneumonitis, psittacosis, trachoma, and inclusion conjuctivitis; and the resulting antigens give cross reactions when used in the complement-fixation test. Thus, a non-infectious (urea-inactivated) antigen of feline pneumonitis obtained by substituting the agent of feline pneumonitis (Baker) for the agent of lymphogranuloma venereum in the method described in Example 1 is suitable, after appropriate dilution (e. g., 1:50), for use in the conventional complement-fixation test for the detection of lymphogranuloma-venereum infections.

The protein-denaturing substances of the aliphatic carbamyl-compound type utilizable in the practice of this invention include, inter alia, urea, thiourea, methyl-urea, ethyl-urea, butyl-urea, unsymmetrical dimethyl- and diethyl-urea, acetamide, formamide, and urethane. The rate of inactivation is a function of the temperature, concentration of antigen, and concentration of inactivating substance, low concentrations of the antigen and of the inactivating substance, and especially low temperature, being the preferred conditions.

This application is a continuation-in-part of application Serial No. 429,102, filed January 31, 1942.

The invention may be variously otherwise embodied within the scope of the appended claims.

We claim:

1. In the method of preparing a non-infectious antigen of the lymphogranuloma-venereum-psittacosis group of agents, the step of treating an infectious antigen of the agent with a protein-denaturing substance of the aliphatic carbamyl-compound type.

2. In the method of preparing a non-infectious lymphogranuloma-venereum antigen, the step of treating an infectious lymphogranuloma-venereum antigen with a protein-denaturing substance of the aliphatic carbamyl-compound type.

3. In the method of preparing a non-infectious antigen of the lymphogranuloma-venereum-psittacosis group of agents, the step of treating an infectious antigen of the agent with urea.

4. In the method of preparing a non-infectious lymphogranuloma-venereum antigen, the step of treating an infectious lymphogranuloma-venereum antigen with urea.

5. In the method of preparing a non-infectious lymphogranuloma-venereum antigen, the step of treating an infectious lymphogranuloma-venereum antigen with urea in dilute aqueous solution.

6. In the method of preparing a non-infectious lymphogranuloma-venereum antigen, the step of treating an infectious lymphogranuloma-venereum antigen with urea in aqueous solution, the urea after addition being in a concentration of the order of 1 to 5%.

7. In the method of preparing a non-infectious lymphogranuloma-venereum antigen, the step of treating an infectious lymphogranuloma-venereum antigen with urea in dilute aqueous solution at a low temperature.

8. The method of preparing a non-infectious lympogranuloma-venereum antigen, which comprises propagating the agent of lymphogranuloma venereum in the yolk sacs of developing fowl-embryos, preparing an aqueous suspension of the agent-containing embryo material, and treating the suspension with a protein-denaturing substance of the aliphatic carbamyl-compound type.

9. The method of preparing a non-infectious lymphogranuloma-venereum antigen, which comprises propagating the agent of lymphogranuloma venereum in the yolk sacs of developing fowl-embryos, preparing an aqueous suspension of the agent-containing embryo material, and treating the suspension with urea in dilute aqueous solution.

10. A non-infectious antigen of the lymphogranuloma-venereum-psittacosis group of agents essentially comprising an infectious antigen of the agent which has been treated with a protein-denaturing substance of the aliphatic carbamyl-compound type.

11. A non-infectious lymphogranuloma-venereum antigen essentially comprising an infectious lymphogranuloma-venereum antigen which has been treated with a protein-denaturing substance of the aliphatic carbamyl-compound type.

12. A non-infectious antigen of the lymphogranuloma-venereum-psittacosis group of agents essentially comprising a urea-treated infectious antigen of the agent.

13. A non-infectious lymphogranuloma-venereum antigen essentially comprising a urea-treated infectious lymphogranuloma-venereum antigen.

14. A non-infectious lymphogranuloma-venereum antigen essentially comprising an infectious preparation of fowl-embryo material diseased with lymphogranuloma venereum which preparation has been treated with a protein-denaturing substance of the aliphatic carbamyl-compound type.

15. A non-infectious lymphogranuloma-venereum antigen essentially comprising a urea-treated infectious preparation of fowl-embryo material diseased with lymphogranuloma venereum.

16. A non-infectious antigen for detection of lymphogranuloma venereum by complement-fixation test, essentially comprising a urea-treated infectious preparation of fowl-embryo material diseased with feline pneumonitis (Baker).

WILLIAM EDWARD BUNNEY.
CLARA NIGG.

REFERENCES CITED

The following references are of record in the file of this patent:

Nigg: Proc. Soc. Exper. Biol. & Med., Feb. 1942, pp. 132–6, copy Surg. Gen. Lib.

Bawden: Biochem J. (1940), vol. 34, pp. 1258, 1265, 1266, 1273, 1274 (copy Sci. Lib.).

Horing: Trans. Royal Soc. Trop. Med. Hyg. (1939), vol. 32, pp. 597–9 (Surg. Gen. Lib.).

Schmidt: Comptes Rendus Soc. Biol., vol. 108, p. 536 (Pat. Off. Sci. Lib.).

Nicolas et al.: Comptes Rendus (1928), vol. 186, pp. 1767–9 (Dept. Agric. Lib.).

Mckay et al: Proc. Soc. Exptl. Biol. Med. (1936), vol. 35, pp. 74–6, copy Surg. Gen. Lib.

Finger: Zent. Bakt. Parasitenk (1939), I Abt. Orig. vol. 139, pp. 82–6 (copy Surg. Gen. Lib.).

Burnet: Med. Research Counc., London 1936, pp. 40 and 41 (copy Surg. Gen. Lib.).